United States Patent
Takahashi et al.

(10) Patent No.: US 7,295,230 B2
(45) Date of Patent: Nov. 13, 2007

(54) CAMERA WITH A TEMPORARY DELETE FOLDER FOR STORING IMAGES THAT ARE DELETED WHEN THE MEMORY BECOMES FULL

(75) Inventors: Tsuneichiro Takahashi, Higashiosaka (JP); Satoshi Kokubo, Daito (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 844 days.

(21) Appl. No.: 10/611,435

(22) Filed: Jul. 2, 2003

(65) Prior Publication Data

US 2004/0105018 A1 Jun. 3, 2004

(30) Foreign Application Priority Data

Jul. 3, 2002 (JP) .............................. 2002-194070

(51) Int. Cl.
*H04N 5/76* (2006.01)
(52) U.S. Cl. .................................................. 348/231.1
(58) Field of Classification Search ............ 348/231.1, 348/231.2, 231.3, 231.4, 231.5, 231.6
See application file for complete search history.

(56) References Cited

U.S. PATENT DOCUMENTS

| | | |
|---|---|---|
| 2,412,707 A | 12/1946 | Barnett |
| 2,477,928 A | 8/1949 | Hartmann et al. |
| 2,848,508 A | 8/1958 | Barnett et al. |
| 4,680,314 A | 7/1987 | Nonomura |
| 4,713,398 A | 12/1987 | Nonomura |
| 5,310,554 A | 5/1994 | Haigh |
| 5,612,485 A | 3/1997 | Schlipalius |
| 6,345,318 B1* | 2/2002 | Gamon ........................... 710/8 |
| 6,810,441 B1* | 10/2004 | Habuto et al. ................ 710/20 |
| 7,075,570 B2* | 7/2006 | Nagaoka ................... 348/231.2 |
| 7,116,361 B2* | 10/2006 | Baron ....................... 348/231.1 |
| 2001/0052933 A1* | 12/2001 | Nybo et al. .................. 348/207 |
| 2002/0051065 A1* | 5/2002 | Takahashi ................... 348/232 |

(Continued)

FOREIGN PATENT DOCUMENTS

AU    80501    2/1982

(Continued)

OTHER PUBLICATIONS

Japanese Office Action dated Apr. 4, 2006.

(Continued)

*Primary Examiner*—Vivek Srivastava
*Assistant Examiner*—James M. Hannett
(74) *Attorney, Agent, or Firm*—Kratz, Quintos & Hanson, LLP (57) ABSTRACT

The present invention provides a data recording device which specifies a file to be deleted from a memory card 11 in response to the user's file deleting manipulation to a manipulation key 8, and moves the specified file to a predetermined temporary delete folder. In recording data, the device calculates remaining capacity of recording area of the memory card 11, to judge whether a series of data to be recorded is recordable. When it is determined that the data is recordable, the data is recorded in the recording area. When it is not determined that the data is recordable, a file included in the temporary delete folder is deleted and the data is recorded in the recording area.

6 Claims, 8 Drawing Sheets

U.S. PATENT DOCUMENTS

2003/0107529 A1* 6/2003 Hayhurst et al. ............. 345/1.1
2004/0179115 A1* 9/2004 Tomat et al. ............. 348/231.6

FOREIGN PATENT DOCUMENTS

| JP | 04-367041 | 12/1992 |
| --- | --- | --- |
| JP | 08-339435 | 12/1996 |
| JP | 09-128276 | 5/1997 |
| JP | 11-232840 | 8/1999 |
| JP | 2000-236503 | 8/2000 |
| JP | 2002-51242 | 2/2002 |

OTHER PUBLICATIONS

CMagazine, (Jun. 1993); vol. 5, No. 1 (partial English translation).

Japanese Office Action dated Dec. 6, 2005.

H.M. Chen and S.P. Meyers, Extraction of Astaxanthin Pigmnet from Crawfish Waste Using a Soy Oil Process, *J. Food Sci.*, vol. 47 (1982), pp. 892-895.

\* cited by examiner

CAMERA WITH A TEMPORARY DELETE FOLDER FOR STORING IMAGES THAT ARE DELETED WHEN THE MEMORY BECOMES FULL

FIELD OF THE INVENTION

The present invention relates to data recording devices, such as digital cameras and IC recorders, which are adapted for recording a series of image data or voice data in a memory as a file, and managing a plurality of files recorded in the memory with a predetermined directory structure.

BACKGROUND OF THE INVENTION

Conventional digital cameras are adapted to record image data of photographed freeze-frame pictures or moving pictures as a file in an external memory card. The image data recorded in the memory card can be deleted by a predetermined deleting manipulation.

The memory card used for compact data recording devices like digital cameras, etc. is limited in data capacity, so that the image data which is once given a deleting manipulation will be unrestorably deleted, whereby the memory card utilizes its memory capacity effectively.

In deleting the image data of the conventional digital cameras, the user performs a first manipulation for selecting and determining an image to be deleted and a second manipulation for permitting a delete confirmation given in accordance with the first manipulation, whereby the overlapping manipulations prevent an erroneous delete. However, with the conventional digital cameras, the user has to perform the overlapping manipulations for deleting the image data, thus entailing the problem of a cumbersome manipulation procedure.

On the other hand, a digital camera is proposed which is adapted to write to a recording medium a temporary delete flag indicating the selected image is specified as deleted temporarily in response to the selection of an image to be specified as deleted temporarily, and to actually delete the image to be specified as deleted temporarily when the recording medium lacks in its remaining capacity in photographing (JP-A 2002-51242). However, there arises the problem that the digital camera should adopt a new file management system with use of the temporary delete flag.

SUMMARY OF THE INVENTION

An object of the present invention is to provide a data recording device which is adapted to delete a given file by a single file delete manipulation, to restore the file which is given a delete manipulation, and further to utilize the memory capacity effectively.

A data recording device of the present invention comprises:
 specifier for specifying one or more files to be deleted in response to a file deleting manipulation by the user,
 file mover for moving the file to be specified as deleted to a predetermined temporary delete folder,
 judge for, in recording data, calculating remaining capacity of recording area of a memory and judging whether a series of data to be recorded can be recorded,
 first data writer for writing the series of data to the recording area when the judge determines that the series of data can be recorded,
 second data writer for deleting at least one file included in the temporary delete folder to enlarge the recording area, and writing the series of data in the recording area when the judge determines that the series of data cannot be recorded.

The temporary delete folder is provided at a directory position which is not bound by a standard to be followed by a directory structure in the memory.

When the user manipulates the data recording device of the present invention to delete a file and specifies a file to be deleted, the specified file moves into the temporary delete folder provided in the predetermined directory while its data is not deleted and remains stored in the memory. Accordingly, in this step, the data can be restored by a predetermined restoring manipulation.

In the case where data is thereafter recorded anew in the memory, the remaining capacity of the recording area of the memory is calculated at first, an inquiry is made as to whether the data to be recorded is recordable. When the answer for the inquiry is affirmative, the data is recorded in the recording area. On the other hand, when the data is not recordable, data of at least one file included in the temporary delete folder is deleted to have the recording area enlarged and to have the new data written to the recording area. What is meant by "deleting data" in this case is a concept including not only erasing the data at that moment but rendering the data overwritable.

Accordingly, as the new data is recorded, data in the temporary delete folder is consecutively deleted, for example, in order of old number, so that the memory capacity is utilized effectively.

Stated specifically, the device comprises deleting date and time writer for writing to the memory date and time when the file is deleted as appended information of the file. The second data writer deletes a file in order of deleting date and time in enlarging the recording area. Alternatively the device comprises file name grantor for granting a file name including a file number as increased every time the series of data is recorded to the memory. The second data writer deletes a file in order of file number in enlarging the recording area. According to the specific construction, the user needs to perform no manipulation in enlarging the recording area.

Stated specifically the device comprises file restorer for restoring a specified file from the temporary delete folder to an original directory position in accordance with the user's file restoring manipulation. Thus the file once deleted can be restored in the same storing state as that before the file is deleted, so that no trouble will occur in handling the file subsequently.

Stated further specifically the device comprises retriever for retrieving a file to be restored from the temporary delete folder in accordance with the user's manipulation for retrieving a file to be restored. This enables the user to restore a desired file.

Furthermore when the file to be specified as deleted is moved to the temporary delete folder, the file mover changes an extension of the file to a specific extension. When a file to be specified as restored is restored from the temporary delete folder, the file restorer changes the extension of the file to the original extension. This makes it impossible to reproduce a deleted file when data in the memory is unauthorizedly copied to another data recording/reproduction device, to thereby ensure security.

As described above, the data recording device of the invention is adapted to delete one or more files with a single delete manipulation, and to restore the file which has been deleted, and further to utilize the memory capacity effectively.

DETAILED DESCRIPTION OF THE EMBODIMENT

Figure 1:
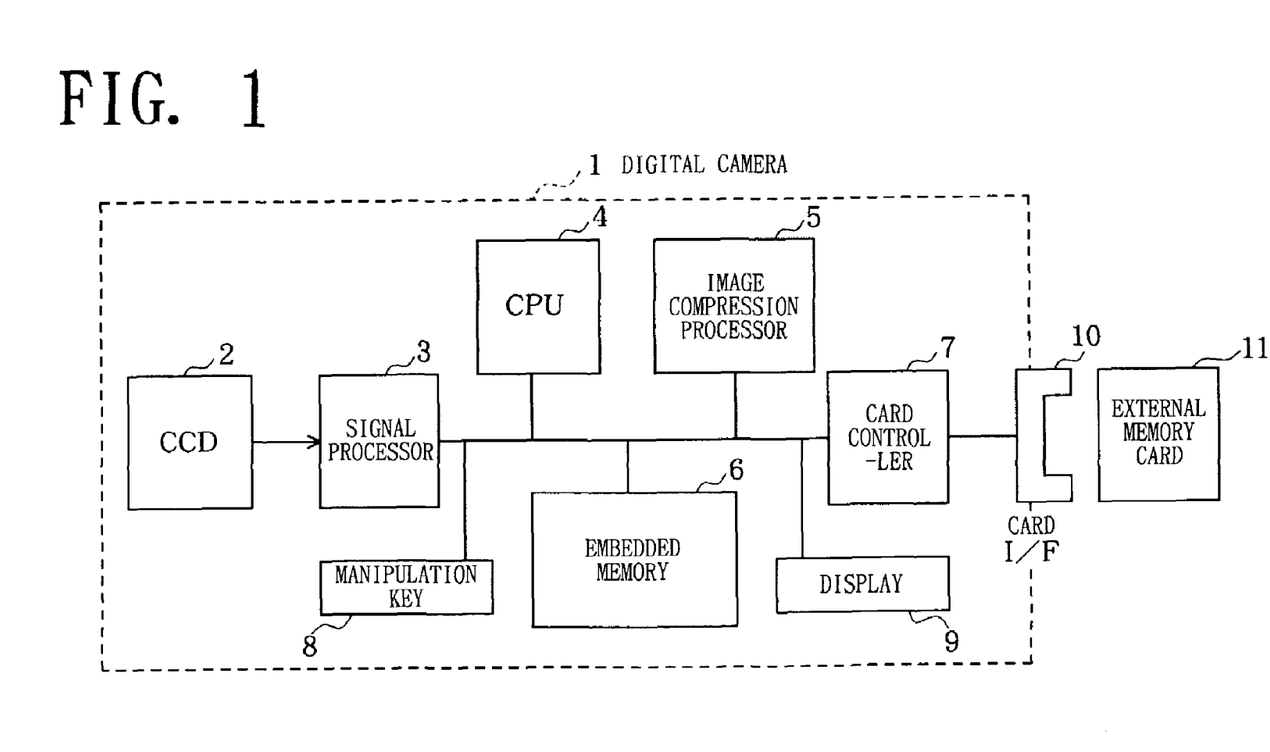
FIG. 1 is a block diagram showing a construction of a digital camera embodying the present invention.

With reference to the drawings the present invention as applied to a digital camera will be described below in detail. FIG. 1 shows a construction of a digital camera 1 embodying the invention which comprises a CCD 2 for photographing images, a signal processor 3 for giving a predetermined signal-processing to image data (raw data) obtained from the CCD 2, a CPU 4, an image compression processor 5 for compressing the image data, an embedded memory 6 used for calculation processing, a card controller 7, a card I/F 10. The card I/F 10 has an external memory card 11 attached thereto removably. The CPU 4 has a manipulation key 8 and a display 9 connected thereto.

In photographing images, the image data obtained from the CCD 2 is fed to the signal processor 3, the data is signal-processed, and the data is thereafter compressed in the image compression processor 5. The compressed data is written as a file to the external memory card 11 under the control of the card controller 7. In this way a plurality of items of image data are written each as a file to the external memory card 11, whereby a directory structure, for example, shown in FIG. 6, is built, to execute file management.

Figure 6:
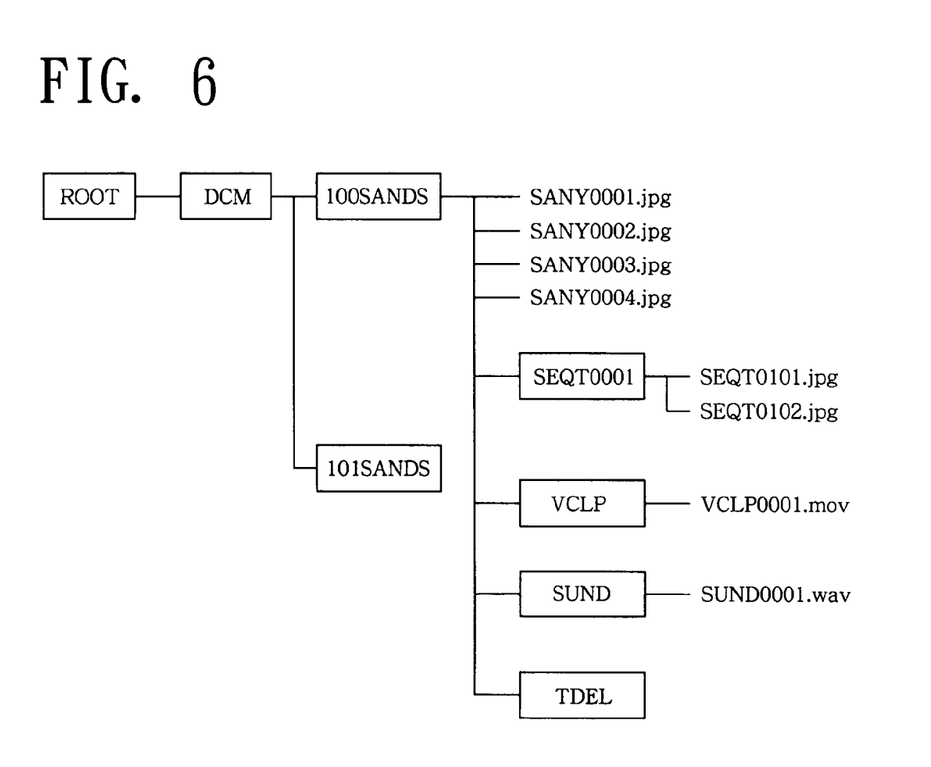
FIG. 6 is a diagram showing a directory structure before a file deleting manipulation.

With reference to FIG. 6, two folders of "100SANDS" and "101SANDS" are prepared. Prepared in the folder of "100SANDS" are four freeze-frame picture files of "SANY0001.jpg", "SANY0002.jpg", "SANY0003.jpg", and "SANY0004.jpg". Prepared in the folder of "100SANDS" are a folder of "SEQT0001" related to successive photographing image, a folder of "VCLP" related to moving pictures, a folder of "SUND" related to voice, and successive photographing image files of "SEQT0101.jpg", "SEQT0102.jpg", a moving picture file of "VCLP0001.mov", and a voice file of "SUND0001.wav" are prepared in the folders, respectively.

Furthermore prepared in the folder of "100SANDS" is a temporary delete folder of "TDEL". The directory position of the temporary delete folder is not bound to the DCF standard, a standard provided for digital cameras, entailing no problem in the preparation of the temporary delete folder.

Figure 7:
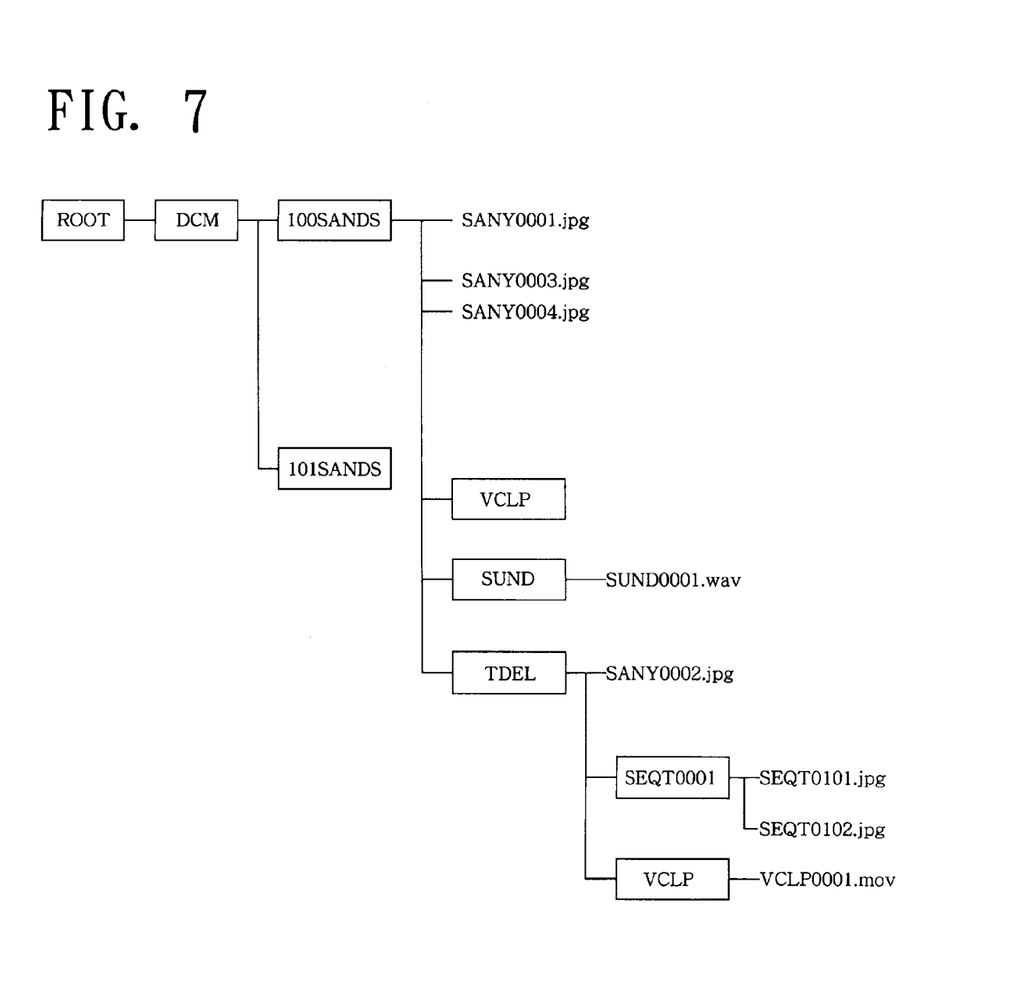
FIG. 7 is a diagram showing a directory structure after a file deleting manipulation.
Figure 8:
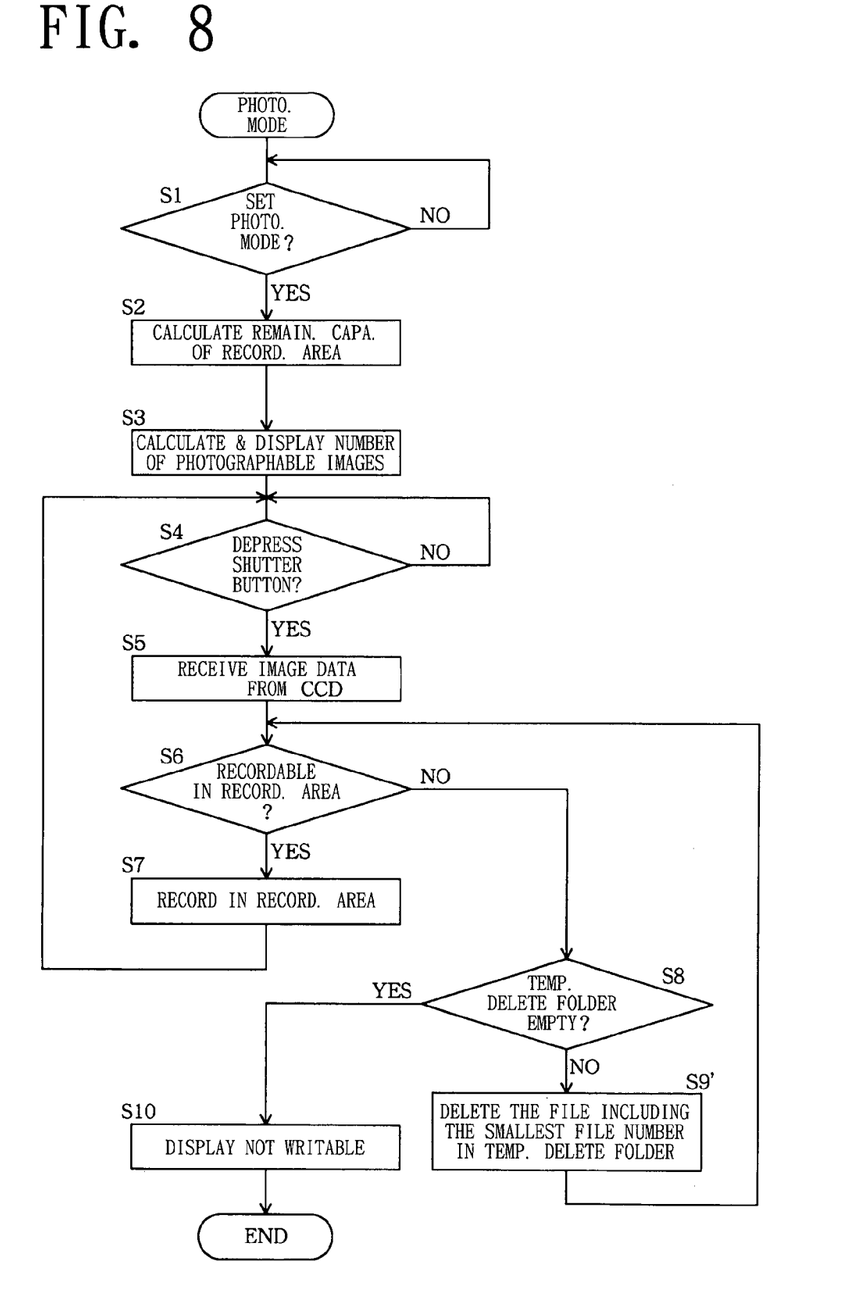
FIG. 8 is a flow chart showing another control procedure in a photographing mode.

With the digital camera 1 of the present invention, the manipulation key 8 is manipulated for deleting a given file or a folder in the external memory card 11 to cause the file or the folder to move from an original directory to the temporary delete folder "TDEL". For example, a manipulation for deleting the freeze-frame picture file "SANY0002.jpg" and the successive photographing folder "VCLP" shown in FIG. 6 is performed to cause the freeze-frame picture "SANY002.jpg" and the successive photographing folder "VCLP" to move to the temporary delete folder "TDEL", as shown in FIG. 7. The manipulation for deleting the moving picture file of "VCLP0001.mov" shown in FIG. 6 is performed, to prepare the moving picture folder "VCLP" in the temporary delete folder "TDEL", to have the moving picture file "VCLP0001.mov" moved under the folder. With the files and the folders moved to the temporary delete folder "TDEL", the data will not be deleted and remain stored in the external memory card 11.

Accordingly, the user performs a predetermined manipulation for restoring the deleted file as will be described below, to have returned to an original directory position specified files and folders in the temporary delete folder "TDEL".

With files and folders included in the temporary delete folder "TDEL" as shown in FIG. 7, a manipulation for recording new data to the external memory card 11 is performed, which an inquiry is made as to whether capacity for recording the data still remains in the memory card 11 at first. If the answer is affirmative, the data is filed to a directory position corresponding to the kind of the data.

On the other hand, when the capacity for recording the data does not remain in the external memory card 11, the file or folder in the temporary delete folder "TDEL" is unrestorably deleted along with its data, to have enlarged the recording capacity remaining in the external memory card 11, permitting the new data to be recorded in the external memory card 11.

Figure 2:
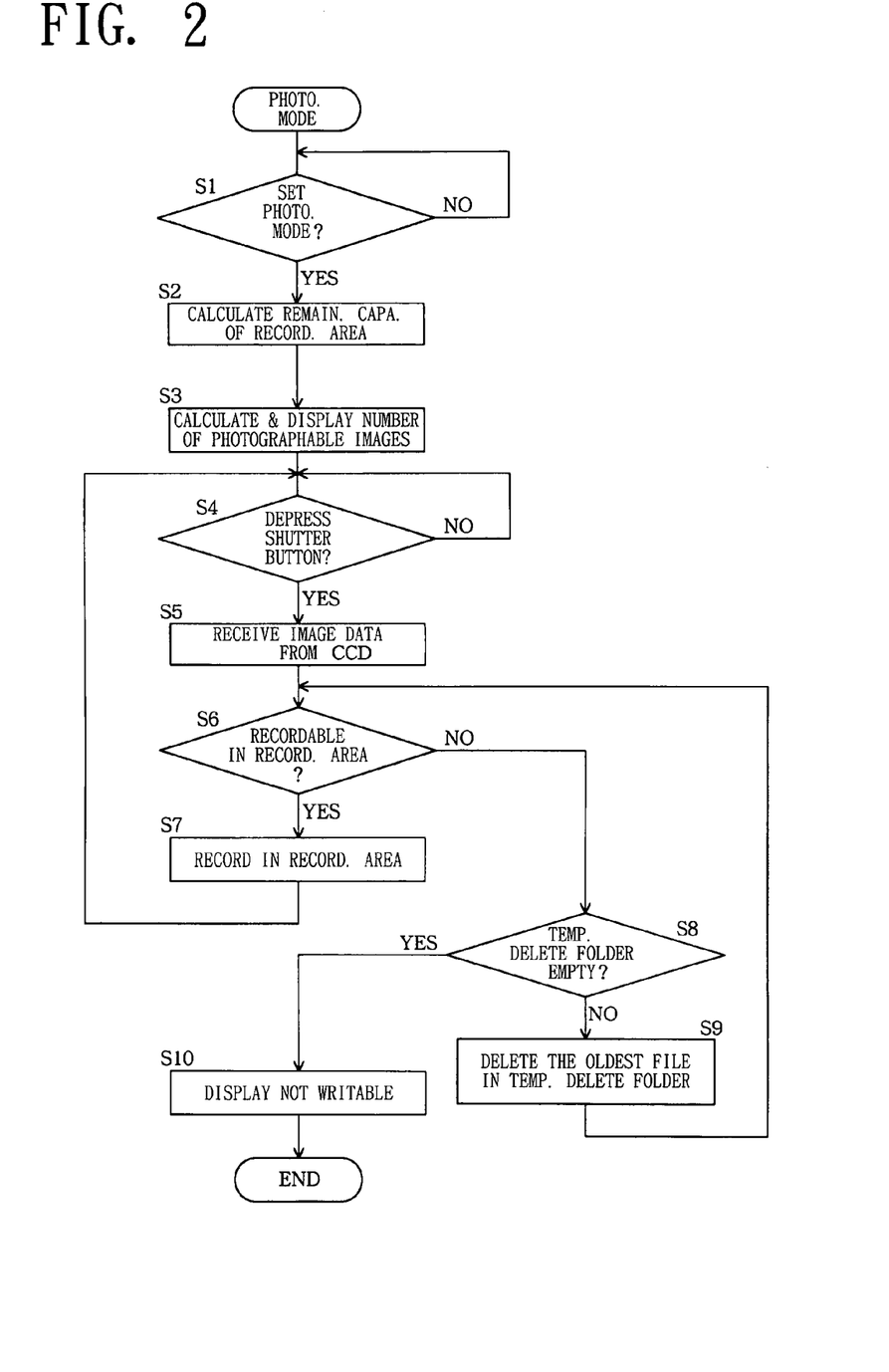
FIG. 2 is a flow chart showing a control procedure in a photographing mode.

FIG. 2 shows a control procedure for photographing images taken by the digital camera 1. An inquiry is made as to whether the user performs a manipulation for setting to a photographing mode first in step S1. If the answer is affirmative, the remaining capacity of recording area of the external memory card is calculated in step S2.

Subsequently, in step S3 the number of photographable images is calculated with reference to the remaining capacity of the recording area to show the result on the display. In step S4 an inquiry is made as to whether a shutter button is depressed. When the answer is affirmative, step S5 follows to receive image data from CCD.

Thereafter in step S6 an inquiry is made as to whether the image data received from the CCD can be written to the recording area. If the inquiry is answered in the affirmative, the data is written to the recording area in step S7, and the sequence is thereafter returns to step S4 to wait for the depression of the shutter button. In recording the image data to the memory card, a file name including the file number as increased every time an image is photographed is prepared and is added to a directory structure shown in FIG. 6.

On the other hand, when the image data received from CCD cannot be written to the recording area and the answer for step S6 is negative shown in FIG. 2, an inquiry is made as to whether the temporary delete folder is in an empty state wherein no file and no folder are present in step S8. If the answer is negative, step S9 follows to delete, along with its data, a file or a folder having the oldest deleting date and time included in the temporary delete folder. Thereafter the sequence returns to step S6 to repeat an inquiry whether the data can be written to the recording area.

As a result, when the answer for step S6 is affirmative, the image data is written to the recording area in step S7.

On the other hand, when the temporary delete folder is in an empty state and the answer for step S8 is affirmative, step S10 follows to have shown on the display the message that the data cannot be written.

According to the procedure described, the file in the temporary delete folder is deleted as required merely by the user's manipulation of the shutter button while the image data of photographed image is recorded to the external memory card. Accordingly the image data in the temporary delete folder does not fully occupy the capacity of the memory card, whereby the capacity of the memory card is utilized effectively.

Figure 3:
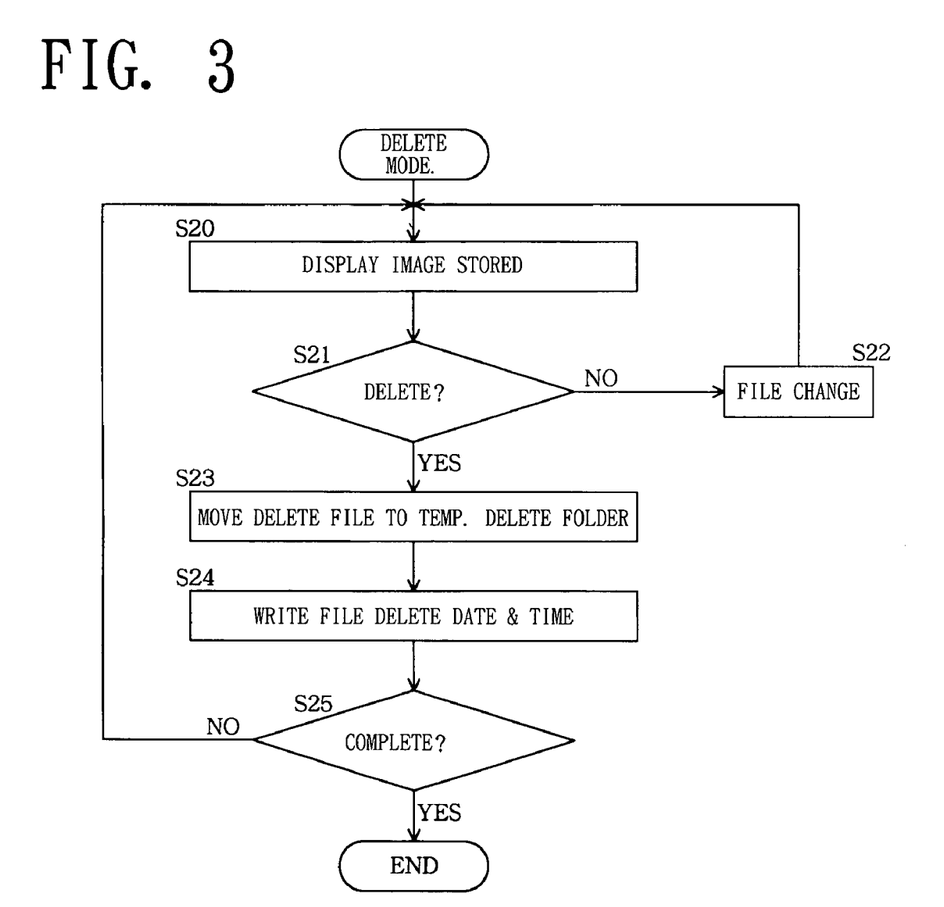
FIG. 3 is a flow chart showing a control procedure in a deleting mode.

FIG. 3 shows a control procedure for deleting a given file from the external memory card 11. First in step S20 images stored in the memory card are displayed, for example, in order of photographing date and time. In step S21 an inquiry is made as to whether the user performs the manipulation for deleting the displayed image. When the answer is negative, the file of the displayed image is changed to a file having the next number in step S22, and then the sequence returns step S20 to update image to be displayed.

When the deleting manipulation is performed and the answer for step S21 is affirmative, step S23 follows to move to the temporary delete folder the image file (delete file) which has been given the delete manipulation. Further the file deleting date and time is written to the user's setting management area which is provided in a header of the file in step S24. Thereafter in step S25 an inquiry is made as to whether the user's deleting manipulation is completed, and the file is repeatedly deleted until the answer becomes affirmative.

According to the procedure described, a given file or folder can be moved to the temporary delete folder only by the user's single deleting manipulation. Thus the image data remains in the external memory card 11, and is deleted temporarily in a restorable state.

Figure 4:
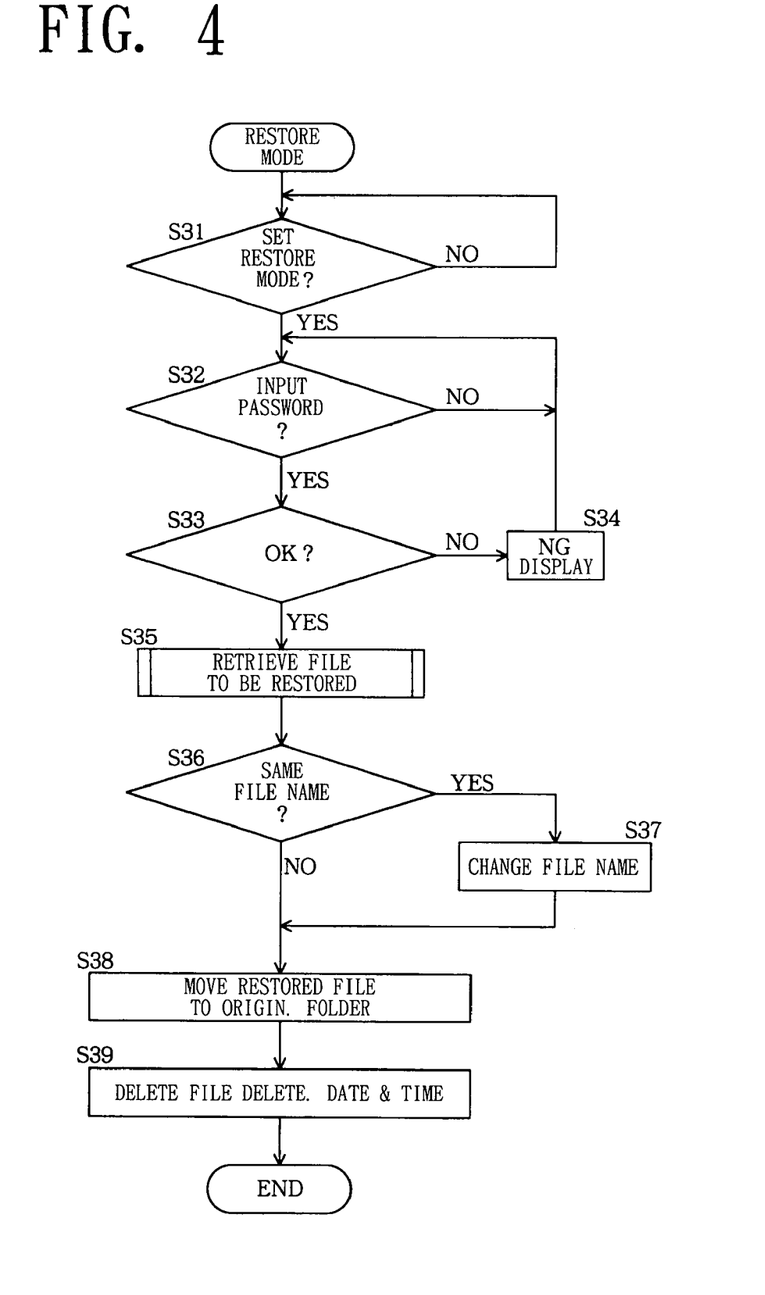
FIG. 4 is a flow chart showing a control procedure in a restoring mode.

FIG. 4 shows a control procedure for returning to an original directory position a file which has been given a deleting manipulation. First in step S31 an inquiry is made as to whether a restoring mode is set. When the inquiry is answered in the affirmative, step S32 follows to inquire whether the user inputs a password. If the inquiry is answered in the affirmative, step S33 follows to inquire whether the input password is correct (OK). When the answer is negative, step S34 follows to have a password error (NG) displayed, and returns to step S32 to wait for the input of the password. When the correct password is input and the answer for step S33 is affirmative, step S35 follows to execute a procedure for retrieving a file to be restored.

Figure 5:
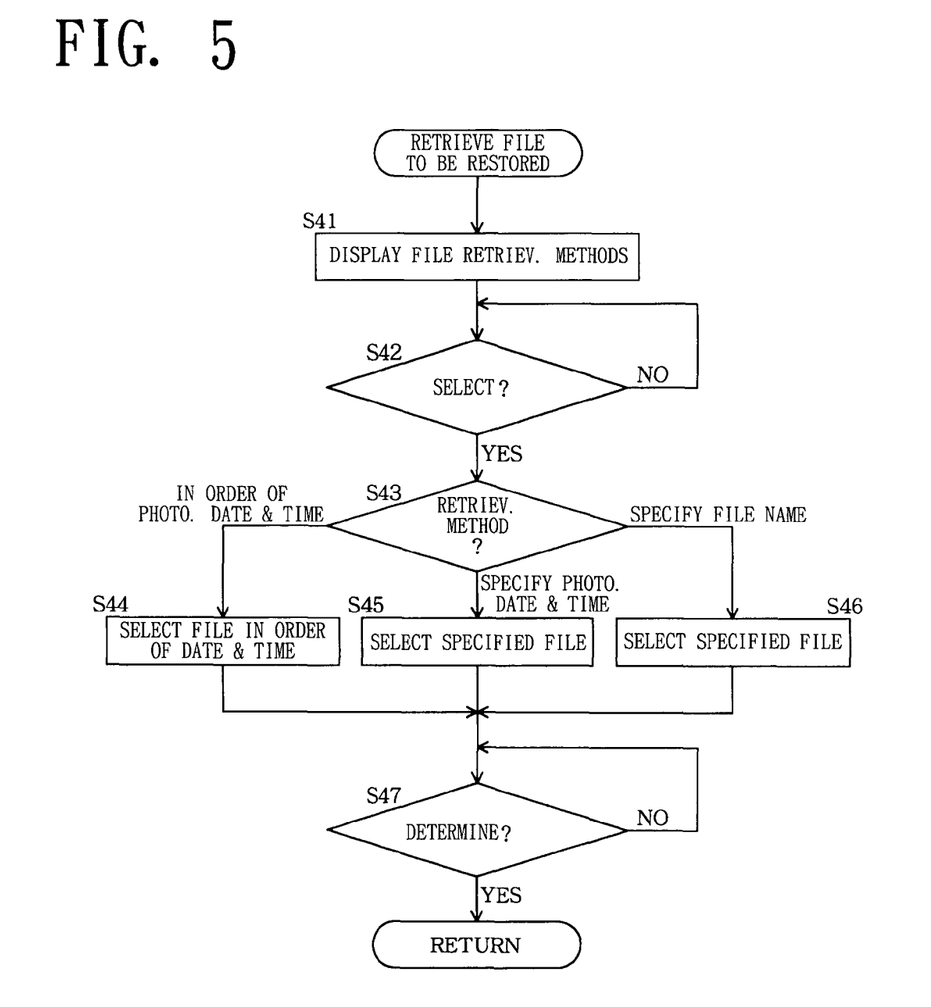
FIG. 5 is a flow chart showing a control procedure for retrieving a file to be restored.

FIG. 5 shows a procedure for retrieving a file to be restored. First in step S41 displayed as methods for retrieving the file are "in order of photographing date and time", "specify photographing date and time", and "specify a file name". In step S42 an inquiry is made as to whether the user selects a method. When the answer is affirmative, step S43 follows to determine which method is selected.

In the case where "in order of photographing date and time" is selected, step S44 follows to select a file to be restored in order of photographing date and time (in an ascending order or a descending order). When "specify photographing date and time" is selected, step S45 follows to select a file to be restored which file has a photographing date and time specified by the user. When "specify a file name" is selected, step S46 follows to select a file to be restored which file has a file name specified by the user.

Thereafter an inquiry is made as to whether the selected file is determined as a file to be restored in step S47. When the answer is affirmative, the procedure is terminated.

When the file to be restored is thus retrieved, an inquiry is made as to whether a file having the same file name as that of the restored file is present in the external memory card 11 in step S36 shown in FIG. 4. If the answer is affirmative, the file name of the restored file is changed to a file name different from any of the file names, followed by step S38 wherein the restored file moves to the original folder, followed by step S39 to delete the file deleting date and time which is written to the header of the file, to complete the procedure.

According to the procedure described, the file deleted by an erroneous manipulation and the file required after deleted can be restored to the original directory position by the user's manipulation for restoring the deleted file, so that the user can delete a file at ease. Further the user can relieve the deleted file to be restored with one of the three methods, hence convenience in the case where the user forgets the file name of the file to be restored, for example.

The digital camera of the present invention enables the user to delete a given file in the memory card by a single file delete manipulation, and to restore the file which has been given a delete manipulation, as described above. The camera further makes it possible to utilize the memory capacity of the memory card effectively.

The device of the present invention is not limited to the foregoing embodiments in construction but can be modified variously by one skilled in the art without departing from the spirit of the invention as set forth in the appended claims. For example, the preparation of the temporary delete folder is not limited to the example wherein the temporary delete folder is prepared into one folder "100SANDS", whereas the folder can be prepared at a given directory position, for example, a root directory "ROOT".

Furthermore, in deleting the files in the temporary delete folder in the photographing mode, the file is to be deleted in order of the oldest deleting date and time in step S9 shown in FIG. 2, but the file can alternatively be deleted in order of the smallest file number included in the file name, i.e., in order of the oldest recording date and time.

Further, if, in the movement of the deleted file to the temporary delete folder, the extension "jpg" of the file is changed to a predetermined extension "sss", for example, or in the return of the deleted file from the temporary delete folder, the extension "sss" of the file is changed to the original extension "jpg", the device cannot reproduce the file of the extension "sss", even in the case of the unauthorized copy of the memory card to another data recording reproduction device, to thereby ensure security of the deleted file.

What is claimed is:

1. A data recording device being adapted to record a series of image data or voice data in a memory as a file, and to manage a plurality of flies recorded in the memory with a predetermined directory structure, the data recording device comprising:

specifier for specifying a file to be deleted in response to a file deleting manipulation by the user, file mover for moving the file to be specified as deleted to a predetermined temporary delete folder, judge for, in recording data, calculating remaining capacity of recording area of the memory and judging whether the series of data to be recorded can be recorded, first data writer for writing the series of data to the recording area of the determines that the series of data can be recorded, second data writer for deleting at least one file included in the temporary delete folder to enlarge the recording area, and writing the series of data to the recording area when the judge determines that the series of data cannot be recorded, and file restorer a specified file from the temporary delete folder to an original directory position in accordance with the user's file restoring manipulation, the file restorer comprising:

judge for determining whether a file having the same file name as that of the specified file is present in the memory, when the specified file is restored from the temporary delete folder, and     changer for changing the file name of the specified to a file name different from any of the file names, if it is determined that file having the same file name is present in the memory.

2. A data recording device according to claim 1 which comprises deleting date and time writer for writing to the memory as appended information of the file date and time when the file is deleted, and the second data writer deletes a file in order of deleting date and time in enlarging the recording area.

3. A data recording device according to claim 1 which comprises file name grantor for granting a file name including a file number as increased every time the series of data is recorded to the memory, the second data writer deletes a file in order of file number in enlarging the recording area.

4. A data recording device according to claim 1 which comprises retriever for retrieving a file to be restored from the temporary delete folder in accordance with the user's file retrieving manipulation.

5. A data recording device according to claim 1 wherein the file mover changes an extension of the file to be specified as deleted to a specific extension in moving the file to the temporary delete folder, and the file restorer changes an extension of a file to be specified as restored to the original extension in restoring the file from the temporary delete folder.

6. A data recording device according to claim 1 wherein the temporary delete folder is provided at a directory position which is not bound by a standard to be followed by a predetermined directory structure.

\* \* \* \* \*

UNITED STATES PATENT AND TRADEMARK OFFICE
CERTIFICATE OF CORRECTION

PATENT NO. : 7,295,230 B2
APPLICATION NO. : 10/611435
DATED : November 13, 2007
INVENTOR(S) : Tsuneichiro Takahashi et al.

It is certified that error appears in the above-identified patent and that said Letters Patent is hereby corrected as shown below:

On the claim 1:

In column (6), line 61, "recording area of the determines that the series of data" should read --recording area when the judge determines that the series of data--.

In column (7), line 1, "file restorer a specific file..." should read --file restorer for restoring a specified file...--.

And in column (7), line 9, "changer for changing the file name of the specified to a file" should read --changer for changing the file name of the specified file to a file--.

Signed and Sealed this

Thirtieth Day of September, 2008

JON W. DUDAS
*Director of the United States Patent and Trademark Office*